E. C. JONES.
AIR AND GAS MIXER.
APPLICATION FILED MAR. 24, 1913.
1,074,266.
Patented Sept. 30, 1913.
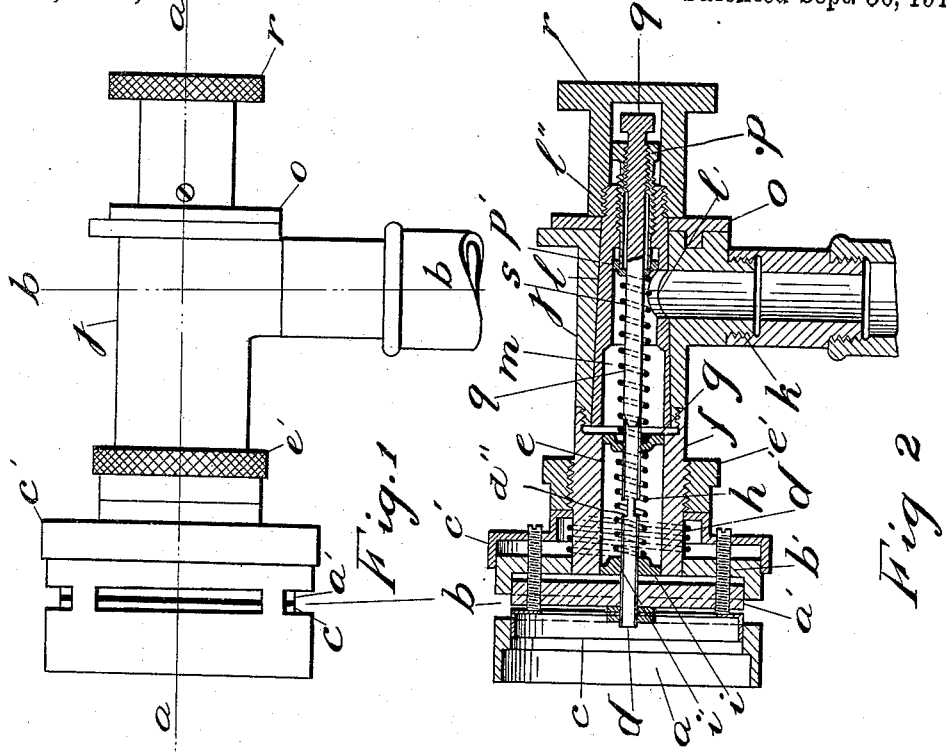
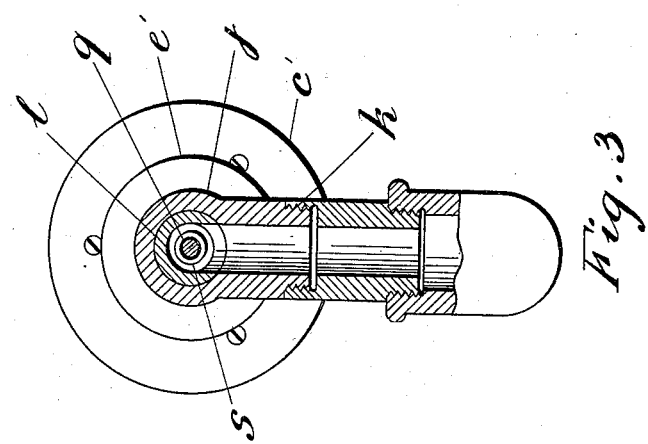
WITNESSES
J. P. Broddy
Edward Bernstein
INVENTOR
Edwin C. Jones
by Chas. W. Rucker
Attorney.

UNITED STATES PATENT OFFICE.

EDWIN CHARLES JONES, OF TORONTO, ONTARIO, CANADA, ASSIGNOR OF ONE-HALF TO JAMES PEARSON, OF TORONTO, CANADA.

AIR AND GAS MIXER.

1,074,266.   Specification of Letters Patent.   Patented Sept. 30, 1913.

Application filed March 24, 1913. Serial No. 756,568.

*To all whom it may concern:*

Be it known that I, EDWIN CHARLES JONES, of the city of Toronto, in the county of York and Province of Ontario, Dominion of Canada, have invented certain new and useful Improvements in Air and Gas Mixers; and I hereby declare that the following is a full, clear, and exact description of the same.

Hydrocarbon gas, whether used for illuminating, heating or explosive purposes, must be combined with atmospheric air for the oxidation of the combustible compounds, and unless the air is combined with the gas in proper proportions, its full illuminating, heating or explosive power cannot be obtained.

My invention therefore relates to the proper combining of atmospheric air and gas in suitable proportions to produce a mixture for the intended purpose, whether it is for heating, lighting, or explosion, and to maintain the same proportions of atmospheric air and gas under varying conditions of gas pressure, and one of the objects of my invention is to automatically control the proportions of air and gas in the mixture by utilizing the variations of gas pressure from normal to increase or decrease the volume of air in proportion to the increased or decreased volume of gas resulting from such pressure variation, and thus maintain the same ratio as under normal conditions of pressure.

In carrying out this invention, I use a specially-constructed mixer provided with a suitable inlet for gas and inlets for air, and I provide the air inlets with an automatically-movable valve controlled by the gas pressure. This mixer may be generally described as comprising a mixing chamber with one or more air intakes, and a movable valve controlling the same, a movable gas inlet tube, one end of which is connected to said movable valve, and the other end opposed to the gas supply, and neutralizing springs engaging the movable gas inlet tube to maintain it normally in a fixed position when the gas pressure is normal, and yieldable to allow the gas inlet tube to move from its normal position when the gas pressure varies from normal and move with it the valve controlling the air intake to provide respectively an increased or decreased volume of atmospheric air in proportion to the increased or decreased volume of gas admitted to the mixing chamber resulting from the variation of gas pressure.

Many of the earlier types of explosive engines were equipped with the mixing chamber in addition to the carbureter to obtain a proper combination of air and gas prior to the explosion. Under favorable conditions, the process of carbureting liquid fuel to the proper quality is readily perfected, but under unfavorable conditions, its explosive efficiency is materially reduced. To neutralize the effects due to unfavorable conditions, the carbureted gas may be passed through a mixing chamber, or the carbureter may be constructed to contain a mixing chamber having air intakes controlled by the gas pressure as it flows from its source to its destination, by means of which the full explosive value of the gas can be automatically controlled under all variations of change in atmospheric conditions and engine operation.

I have shown in the accompanying drawings, a means by which I can carry out the above principle, but the structural character of this means may be varied without departing from the spirit of the invention.

Figure 1, is a side elevation of a mixer; Fig. 2, is a longitudinal section through the same on the line *a—a* Fig. 1; and, Fig. 3, is a cross sectional view on the line *b—b* Fig. 1.

Like characters of reference refer to like parts throughout the specification and drawings.

The essential feature of the invention may be said to be the mixing chamber *a* which is provided with an air intake or intakes *b*, and an automatically adjustable valve *c* controlling the area of the air intake or intakes; but as the shape and dimensions of the mixing chamber and the number of air intakes will depend entirely upon the individual views of the manufacturer, and the purpose for which the mixer is to be used, I do not wish to confine the invention to any particular type or design in respect thereto.

In order to provide for the automatic adjustment of the valve *c*, I fixedly connect it to a movable gas tube *d*, one end of which projects sufficiently into the mixing chamber *a* to be fixedly connected with the valve *c*, and the other end of which is contained in the bore *e* of a tubular collar *f* forming part of the mixing chamber *a*. That end of the movable gas tube *d* within the tubular collar *f* is provided with a disk *g* of substantially the same diameter as the bore *e* to engage the wall of the bore and assist in guiding the movement of the gas tube as it changes its position during the variation of the gas pressure, as hereinafter described. Encircling the gas tube *d*, is a spring *h*, one end of which bears against the adjacent face of the disk *g*, and the other end of which bears against a shoulder *i* adjacent to the mixing chamber end of the collar. The shoulder *i* is formed with a central bore *i'* of a diameter corresponding to that of the movable gas tube to assist the disk *g* in correctly guiding the lengthwise movement of the gas tube during the variation in gas pressure.

Fitted to the tubular collar *f* is a sleeve *j* having a connection *k* for the gas supply, and within the sleeve *j* is a hollow rotary valve *l* to control the admission of the gas supply through the connection *k*. The valve *l* has a port *l'* which, when opposed to the bore of the connection *k*, permits of the flow of gas into the gas chamber *m* within the valve, and is provided with a lever *o* by which it can be turned to bring the port *l'* into or out of line with the bore of the connection *k*. Adjustable through the end *l''* of the valve *l* is a tubular stem *p* having at its inner end a disk *p'*, and adjustable through the tubular stem *p* is the stem *q* of the needle valve *q'* opposed to the inner end of the movable gas tube *d*.

Fitted on the outer end of the hollow rotary valve *l* is a cap *r* which, locks the lever *o* in its set position, protects the stem *p* and needle valve *q'* in their set position, and prevents the escape of gas from that end of the rotary valve *l* when the valve is positioned for the flow of the gas from the connection *k*.

Within the gas chamber *m* is a spring *s* bearing against the disks *g* and *p'* to neutralize the force of the spring *h* and maintain the gas tube *d* in a normal position when the gas pressure is normal.

The purpose of the adjustment of the tubular stem *p* is to regulate the force of the spring *s* relatively to the force of the spring *h*, which is as follows:—Assuming that the normal gas pressure is two pounds to the square inch and that the force exerted by the spring *h* and disk *g* is three pounds per square inch, in that case, the spring *s* would require to be adjusted so that it would exert a pressure of slightly more than one pound per square inch upon the disk which, taken in conjunction with the normal gas pressure, would move the disk *g* and gas tube *d* in the direction of the mixing chamber *a* and effect a slight movement of the valve *c*. This movement of the valve *c* would slightly open the air intake or intakes *b* and permit of a proper proportion of air entering the mixing chamber *a* to combine with the gas admitted to the mixing chamber through the gas tube *d*. As the pressure of the gas against the disk *g* rose above normal, the spring *h* would correspondingly compress and permit of an increased movement of the gas tube *d* in the direction of the mixing chamber, this increased movement of the gas tube causing a corresponding movement of the valve *c* to increase the area of the air intake so that an increased volume of air to the mixing chamber would immediately occur. In this way, it is possible for me to utilize the variation of gas pressure for accurately controlling the proper proportions of air and gas in the mixing chamber which, as previously described, is necessary for perfect combustion for heating purposes, nearly perfect combustion for illuminating purposes, and the production of an explosive mixture for motive purposes.

When not in use, it is possible for the air to leak into the bore *e* of the tubular collar *f*, and to provide for its eduction, I form the movable gas tube *d* with one or more openings *d''*. The presence of these openings *d''* permits of the contents of the bore *e* being sucked into the gas tube as the gas passes through it from the gas chamber *m* to the mixing chamber *a*, this suction then permitting of the gas pressure and force of the spring *s* against the disk moving the gas tube in the direction of the mixing chamber, which immediately results in the opening of the air intake or intakes for the admission of the air to combine with the gas.

To enable the same mixer to be used for any one of the above three purposes, I have provided the mixing chamber with adjustable means for varying the area of the air intake, as the area of the air intake for heating purposes must be greater than that for illuminating purposes, and the area of the air intake for explosive purposes must be greater than that for heating purposes.

To change the area of the air intake, I have provided the mixing chamber *a* with a shutter *a'* located between the valve *c* and the adjacent end of the mixing chamber, and I have fitted the shutter *a'* with guide pins *b'* extending through that end of the mixing chamber and fitted to a guide collar *c'* movable on the tubular collar *f*. Between the guide collar *c'* and the end of the mixing chamber *a* is a spring *d'* to press the guide collar away from the end of the mixing chamber. The tubular collar *f* is screwthreaded for the adjusting nut $e'$ by which the guide collar $c'$ and guide pins $b'$ are to adjust the shutter $a'$ to the air intake $b$.

For explosive purposes, the adjusting nut $e'$ is positioned to permit of the spring $d'$ forcing the guide collar $c'$ and guide pins $b'$ outward to their limit of motion, which is determined by the shutter $a'$ coming into contact with the end of the mixing chamber $a$. In this position, the shutter $a'$ is entirely clear of the air intake $b$, and when the shutter is in that position, the air intake is opened to its maximum extent.

For heating purposes, the adjusting nut $e'$ is positioned to move the shutter $a'$ away from the end of the mixing chamber $a$ to slightly close the air intake or intakes and thus partly reduce the area of the same, and for illuminating purposes, it is adjusted in the same direction to move the shutter $a'$ farther away to still further reduce the area of the air intake or intakes.

I have already stated that the purpose of the adjustment of the tubular stem $p$ is to regulate the force of the spring $s$ on the disk $g$, and when this tubular stem $p$ is adjusted for this regulation, it is necessary to effect a corresponding adjustment of the stem $q$ of the needle valve $q'$, so that the needle valve $q'$ will be properly positioned to enter the adjacent end of the gas tube $d$ when the gas tube is at a position of rest, so that there will be no escape of the gas remaining in the gas chamber $m$ when the rotary valve has been moved to close the gas inlet.

Having thus fully described the nature of my invention, what I claim as new and desire to secure by Letters Patent, is:—

1. An air and gas mixer comprising a mixing chamber having an air intake, a valve controlling the air intake, and an automatically-movable gas inlet tube operably connected with said valve, said inlet tube being sensitive to variations of gas pressure, whereby it automatically adjusts said valve to regulate the air intake and maintain the same proportions of air and gas in the mixing chamber under varying conditions of gas pressure.

2. An air and gas mixer comprising a mixing chamber having an air intake, a valve controlling the air intake, an automatically-movable gas inlet tube operably connected with said valve, said inlet tube being sensitive to variations of gas pressure, whereby it automatically adjusts said valve to regulate the air intake and maintain the same proportions of air and gas in the mixing chamber under varying conditions of gas pressure, and balancing means to maintain said gas inlet tube and valve in a normal position under normal conditions of gas pressure.

3. An air and gas mixer comprising a mixing chamber having an air intake, a valve controlling the air intake, a movable gas inlet tube operably connected with said valve, said inlet tube being sensitive to variations of gas pressure whereby it automatically regulates the air intake to maintain the same proportions of air and gas in the mixing chamber under varying conditions of gas pressure, and means for balancing said inlet tube and valve in their normal position under normal conditions of gas pressure.

4. An air and gas mixer comprising a mixing chamber having an air intake, a valve controlling the same, and a gas inlet tube operably connected with said valve, said gas inlet tube being sensitive to variations of gas pressure, whereby it positions said valve with respect to the air intake to maintain the same proportions of gas and air in the mixing chamber under varying conditions of gas pressure.

5. An air and gas mixer comprising a mixing chamber having an air intake, an adjustable valve controlling the air intake, a movable gas inlet tube operably connected with said valve and sensitive to variations of gas pressure whereby it adjusts said valve relatively to the air intake, and means for balancing said inlet tube and valve to maintain them in a normal fixed position under normal conditions of gas pressure.

6. An air and gas mixer comprising a mixing chamber having an air intake, an adjustable valve controlling the air intake, a movable gas inlet tube operably connected with said valve and sensitive to variations of gas pressure whereby it adjusts said valve relatively to the air intake, means for balancing said inlet tube and valve to maintain them in a normal fixed position under normal conditions of gas pressure, an adjustable shutter for determining the area of the air intake, and means for adjusting the shutter thereto.

7. An air and gas mixer comprising a mixing chamber having an air intake, an adjustable valve controlling the air intake, a movable gas inlet tube operably connected with said valve and sensitive to variations of gas pressure whereby it adjusts said valve relatively to the air intake, means for balancing said inlet tube and valve to maintain them in a normal fixed position under normal conditions of gas pressure, and a needle valve opposed to the inlet end of said gas inlet tube.

8. An air and gas mixer comprising a mixing chamber having an air intake, an adjustable valve controlling the air intake, a movable gas inlet tube operably connected with said valve and sensitive to variations of gas pressure whereby it adjusts said valve relatively to the air intake, means for balancing said inlet tube and valve to maintain them in a normal fixed position under normal conditions of gas pressure, and means for adjusting said balancing means to the normal gas pressure.

9. An air and gas mixer comprising a mixing chamber having an air intake, an adjustable valve controlling the air intake, a movable gas inlet tube operably connected with said valve and sensitive to variations of gas pressure whereby it adjusts said valve relatively to the air intake, means for balancing said inlet tube and valve to maintain them in a normal fixed position under normal conditions of gas pressure, a needle valve opposed to the inlet end of said gas inlet tube, means for adjusting said balancing means to the normal gas pressure, and means for adjusting the needle valve relatively to the gas inlet tube.

Toronto, February 21st, 1913.

EDWIN CHARLES JONES.

Signed in the presence of—
EDWARD BERNSTEIN,
CHAS. H. RICHES.

---

Copies of this patent may be obtained for five cents each, by addressing the "Commissioner of Patents, Washington, D. C."